United States Patent [19]

Schuster

[11] 3,887,805
[45] June 3, 1975

[54] MEASURING APPARATUS

[75] Inventor: Nick A. Schuster, Darien, Conn.

[73] Assignee: Schlumberger Limited, New York, N.Y.

[22] Filed: Apr. 16, 1973

[21] Appl. No.: 351,230

Related U.S. Application Data

[60] Continuation of Ser. No. 64,846, July 29, 1970, abandoned, which is a division of Ser. No. 686,404, Nov. 29, 1967, Pat. No. 3,546,454.

[52] U.S. Cl. ................ 250/264; 250/266; 250/269
[51] Int. Cl. ............................................. G01t 1/16
[58] Field of Search .......... 250/262, 264, 265, 266, 250/269

[56] References Cited
UNITED STATES PATENTS 3,240,938  3/1966  Hall, Jr. ............................ 250/264

Primary Examiner—James W. Lawrence
Assistant Examiner—Davis L. Willis
Attorney, Agent, or Firm—Amster & Rothstein

[57] ABSTRACT

An illustrative embodiment of the invention discloses a borehole effects compensation technique for a neutron logging tool. A third neutron detector (or its physical equivalent) is joined to a two-neutron detector formation porosity logging tool. The third detector equivalent is positioned within the tool a distance relative to the neutron source and the other detectors that enables changes in the signal from the third detector caused by variations in the borehole environment to be generally distinguishable from changes in the signal from at least one of the other detectors. The signals from the third detector and one of the two other detectors are combined in order to compensate for the influence of the borehole environment.

20 Claims, 4 Drawing Figures

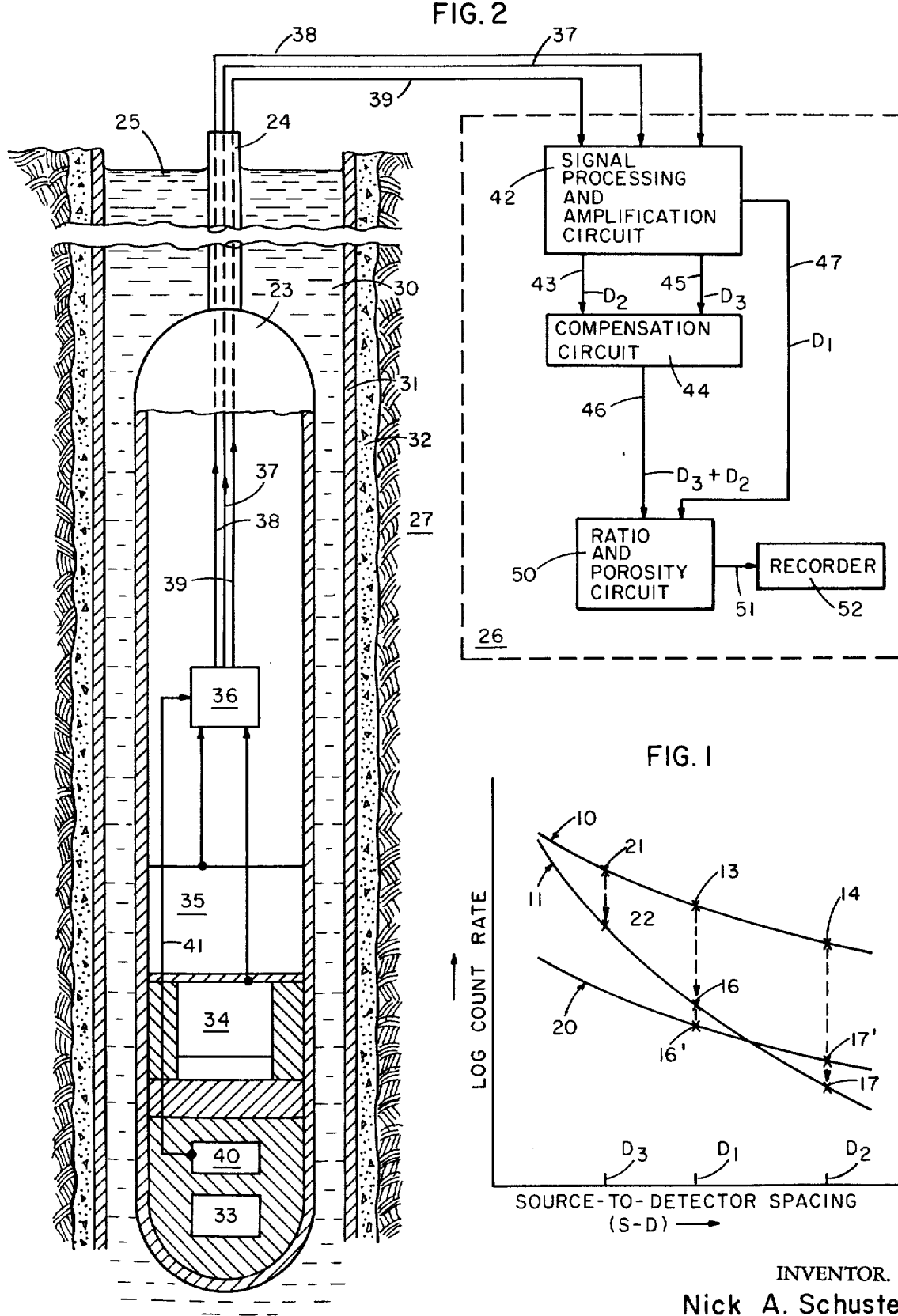

MEASURING APPARATUS

This is a continuation of application Ser. No. 64,846 filed July 29, 1970, now abandoned, which is a division of application Ser. No. 686,404 filed Nov. 29, 1967 now U.S. Pat. No. 3,546,454 issued on Dec. 8, 1970.

BACKGROUND OF THE INVENTION

1. Field of the Invention

This invention relates to borehole logging apparatus and, more particularly, to apparatus for measuring the porosity of an earth formation in spite of changes in the borehole environment by observing the distribution of irradiating neutrons within the formation, and the like.

2. Description of the Prior Art

Because present technology enables oil and natural gas to be produced only from porous or fractured earth formations, a knowledge of subsurface porosities is of basic industrial importance.

In principle, by drawing a neutron-emitting tool through a borehole to irradiate the surrounding earth formations, radiation patterns ought to be established that uniquely identify the porosities of the formations under consideration. In the field, however, the borehole environment tends to degrade the accuracy of these tools. For example, strings of steel pipe and irregular annuli of cement casing often are used to prevent caving and fluid communication between the different formations traversed by the borehole. Through scattering and absorption, these casing materials sometimes exert such a dominant influence on the neutron distribution that the apparent formation porosity observed in these circumstances is erroneous or misleading. Thus, a need exists for a neutron porosity tool that is not sensitive to changes in the borehole environment.

More particularly, it has been observed that the neutron detector count rate usually decreases in the borehole with increasing separation between the neutron source and the neutron detector. A graph of the logarithm of the neutron detector count rate in a given mineral composition of constant porosity as a function of the separation between the neutron source and the detector may be drawn for a particular borehole condition. Different curves will be obtained, depending on the specific borehole environment as, for example, a particular cement thickness or borehole diameter. These semi-logarithmic curves at distances sufficiently far from the source may be approximated by straight lines, each line exhibiting a distinct slope in accordance with the particular borehole variable under consideration.

Changes in the porosity of the formation also produce variations in the observed neutron detector count rate. Consequently, in the field it is often difficult to determine if a specific change in the neutron detector count rate indicates a change in the formation porosity or, for example, a change in the cement thickness.

Thus, it is an object of the invention to mitigate the influence of borehole characteristics on logging tool response.

It is still another object of the invention to provide an improved technique to compensate for the influence of the borehole environment on the radiation pattern established by a neutron logging tool.

SUMMARY

In accordance with the invention, the influence of variations in the borehole environment on neutron porosity logging tool signals is overcome by combining a signal that reflects these variations with the signal from a neutron detector, or its physical equivalent, that also reflects these same variations, but in a generally different or distinguishable manner.

More specifically, a two-neutron detector porosity logging tool is provided with a primary radiation source that continuously emits neutrons. A short-spaced neutron detector is placed close to this source. A long-spaced detector is separated from the source by a distance that is at least equal to that which is occupied by the short-spaced detector. The ratio of the neutrons, or "counts," registered with the long-spaced and the short-spaced detector accurately identifies the porosity of the formation under study, subject to the influence of the aforementioned variations in the borehole environment. A tool of this sort is described in more complete detail in U.S. patent application Ser. No. 570,068, filed Aug. 3, 1966 by Stanley Locke, Harold Sherman and John S. Wahl for "Measuring Apparatus and Method" and assigned to the assignee of the invention described herein.

In accordance with an embodiment of the invention, a secondary (and weaker or less intense) neutron source is spaced close to the long-spaced detector. The secondary source spacing is so close to the long-spaced detector that at least a substantial portion of the active neutron-detecting volume of the long-spaced detector is positioned adjacent to the weaker neutron source. Neutrons from the weaker source respond to an increase in cement thickness, for example, by producing a higher count rate in the long-spaced detector. At the same time, the increased casing thickness causes the neutron population attributable to the primary source to decrease at the long-spaced detector. Accordingly, the secondary neutron source establishes a signal in the long-spaced detector that tends to compensate the primary neutron source signal for changes in the borehole characteristics.

Clearly, the secondary neutron source, or any other apparatus that responds to variations in the neutron distribution in the borehole environment to produce a signal that introduces changes into at least one of the porosity logging detector signals by reason of the same borehole variation, is a physical equivalent to the third detector hereinbefore described. Illustrative of this physical equivalency, another embodiment of the invention uses a high energy or fast neutron reflector as a "virtual" secondary neutron source.

In this instance, a mass of material with a high inelastic neutron scattering cross section such as copper or tungsten and the like, is placed adjacent to the long-spaced neutron detector, in about the same place as the position occupied by the secondary neutron source described above. The neutron scattering characteristic of the material tends to reflect back into the formation those neutrons that are emitted from the primary source and reach the reflector with substantial amounts of their initial energies. Thus, the reflector produces an additional center for the dispersion of high energy neutrons (neutrons with energies greater than about 100 keV, for example). These reflected neutrons tend to compensate the primary source neutron distribution registered by the long-spaced detector for changes in the borehole environment as described generally with regard to the secondary neutron source and the third neutron detector.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 1 is a semilogarithmic graph of neutron detector count rate as a function of source-to-detector separation, in which some features of the curves have been exaggerated to illustrate certain principles of the invention;

FIG. 2 is a schematic diagram of an exemplary embodiment of the invention with the associated electrical circuits shown in block diagram form;

DESCRIPTION OF THE PREFERRED EMBODIMENTS

Figure 3:
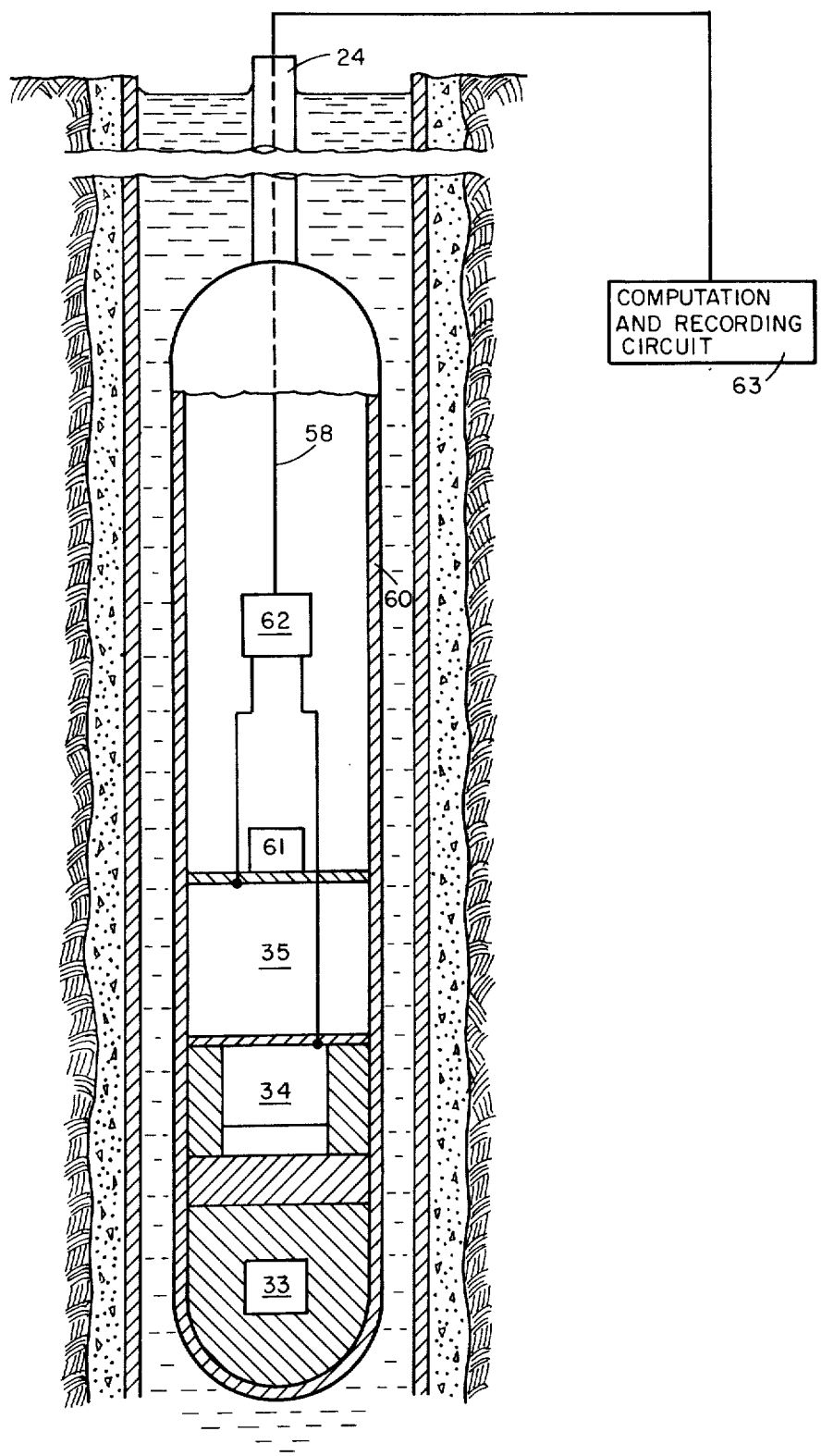
FIG. 3 is a schematic drawing of an alternate embodiment of a logging tool in accordance with the invention.

To better illustrate the invention, a graph of the logarithm of neutron detector count rate as a function of source-to-detector spacing is shown in FIG. 1.

A curve 10 illustrates the decline in observed neutron count rate with increasing separation between the neutron detector and the neutron source. The curve 10, moreover, characterizes the neutron distribution observed from a borehole of specific diameter and cement thickness in an earth formation of known mineral composition and porosity. By slightly decreasing the borehole cement thickness in the same formation, the neutron distribution changes as shown by a curve 11.

Clearly, the neutron distribution illustrated by the curve 10 starts with a higher initial count rate than the neutron distribution characterized by the curve 11. A change in the formation porosity, however, also causes the neutron distribution to shift as indicated by a curve 20. Consequently, a change in neutron count rate for a specific source-to-detector spacing in ambiguous because the detector signals taken alone do not identify the underlying cause for the neutron detector signal change.

A logging tool containing two neutron detectors $D_1$ and $D_2$ spaced at different distances from a neutron source in the borehole environment defined by the curve 10 are separated from the neutron source by the distance indicated on the horizontal axis and register the count rates shown by points 13 and 14, respectively. If the logging tool is moved to a place within the same formation characterized by a thinner cement annulus, the neutron detector responses then are indicated by points 16 and 17 on the curve 11.

A change in the porosity of the formation, however, would produce a similar neutron detector response. Consequently, the signal from the detector corresponding to the points 16 and 17 are ambiguous. Illustrative of this situation, the curve 20 shows the neutron detector responses in a formation that has a different porosity than that which established the curves 10 and 11. The borehole cement thickness contributing to the curve 20 is the same as the cement thickness that contributed to the curve 10. The difference in counting rates at the points 16 and 17 on the curve 11 and corresponding points 16' and 17' on the curve 20 are very small. As a practical matter, because of the demand for maximum logging speeds and the statistical fluctuations in the observed neutron population, it is almost impossible to identify the slight separations between the points 16—16' and 17—17' in field operations.

In accordance with the invention, however, a third neutron detector $D_3$ (or its physical equivalent) is positioned within the logging tool between the neutron source and the detector $D_1$ to produce the neutron count rate indicated by a point 21 on the curve 10.

With a decrease in the cement thickness the neutron distribution registered by the logging tool as indicated by the curve 11 causes the signal from the third detector also to decrease as illustrated by the direction of the arrow drawn to a point 22 on the curve 11. The vertical separation between the points 21 and 22, representing the change in the signal from the third detector, is related to the change in the signal from the long-spaced detector as indicated by the direction of the arrow and separation between the points 14 and 17. Inasmuch as the vertical axis for plotting the curves 10, 11 and 20 is the logarithm of the count rate, the numerical values of the points 21 and 22 may be greater than the values of the points 14 and 17 by a factor of 10. Accordingly, a suitable combination of these two signal changes approximately compensates for the decrease in the cement thickness in the example chosen. For example, adding the signal from the detector $D_3$, identified by the point 22, to the signal from the detector $D_2$, as indicated by the point 17, enables the expression $D_1/D_2 + D_3$ to be computed in order to calculate the formation porosity. Although the correction provided by adding the signals from detectors $D_2$ and $D_3$ is inexact, the resulting approximation compensates for changes in cement thickness better than the bare ratio that heretofore characterized the prior art.

This technique, moreover, is not limited to borehole cement thickness compensation, but also is applicable to other borehole environmental conditions, for example, changes in borehole diameter in uncased holes.

A typical apparatus for practicing the invention is shown in FIG. 2.

A fluid-tight pressure resistant housing 23 is suspended by an armored cable 24 in a borehole 25. As will be described later in detail, the cable 24 may comprise a group of insulated conductors that electrically connect the equipment within the housing 23 with a computer 26 at the earth's surface. A winch (not shown) located at the surface of the earth is utilized to lower and raise the apparatus in the borehole 25 in the customary manner to traverse earth formations 27. The borehole 25 may be dry, or may be filled with a water-base or oil-base drilling mud 30 as shown. The borehole 25, moreover, may be uncased or it may be lined with one or more strings of steel casing 31 surrounded by cement 32, also as shown.

A neutron source 33 is supported within the lowermost end of the housing 23 in order to irradiate the formation 27 with neutrons. Typically, the source 33 can be a 20 curie plutonium-beryllium or americium-beryllium chemical source for emitting neutrons that have average energies in the range from about 4 to 5 MeV. As described in more complete detail in the aforementioned Locke et al patent application, the neutrons emitted from the source 33 diffuse through the formation 27 and are registered by a short-spaced detector 35 ($D_1$ in FIG. 1) and an adjacent long-spaced neutron detector 35 ($D_2$ in FIG. 1). The detectors 34 and 35 each preferably comprises a hollow cylindrical cathode filled with a neutron sensitive gas, as helium 3 ($He^3$) or boron trifluoride ($BF_3$), for example. An anode wire in the center of the cylinder establishes a voltage gradient through the gas-filled cylinder that enables ionized nuclear particles, produced as a consequence of neutron absorption within the gas nuclei, to establish charge pulses in the detector electrodes.

Typically, these detectors are spaced from the source 33 on the order of 13" and 15", respectively. The specific points of measurement for these source-to-detector separations preferably are the effective center of the source 33 and the effective centers of the detectors 34 and 35. The geometric centers of the source and the detectors, or some other convenient physical points of reference also are suitable for this purpose.

The long-spaced detector 35 has a diameter that is coextensive with the diameter of the housing 33 in order to be more sensitive to neutrons than the short-spaced detector 34. In this manner, the signal from the detector 35 is enhanced in order to improve the statistical accuracy of the measurement.

A downhole electrical circuit 36 responds to the signals from the detector 35 and processes these signals for transmission to the earth's surface through a conductor 37 in the armored cable 24. Signals from the detector 34, moreover, are sent through the borehole in a conductor 38. Discrimination against noise, signal amplification and scaling exemplify signal transmission processing operations performed by the circuit 36.

In accordance with the invention, a third neutron detector 40 ($D_3$ in FIG. 1), which preferably is similar to the detectors 34 and 35, is positioned between the short-spaced detector 34 and the source 33. The separation is so chosen that changes in the detector 40 response to borehole variations is basically different from changes in the signal from the detector 35.

Thus, the third detector 40 is spaced relative to the source 33 and the detector 35 an appropriate distance to produce signal changes that increase and decrease in response to the borehole environment in a manner that is different from the corresponding response of the long-spaced detector 35. Depending on the characteristics of the formation 27, detector sensitivities, source strength and the like, the signal from the detector 40 may be an experimentally determinable fraction of the output signal from the long-spaced detector 35. As hereinbefore considered, the points 21 and 22, plotted as a function of the logarithim, can be greater in numerical value than the points 14 and 17 by a factor of 10 or more (FIG. 1). In this situation, appropriate sealing circuits can be provided in the housing 23 (or on the earth's surface) to reduce the signals from the detector 40 to the same order of magnitude as the signals from the detector 35 for borehole compensation purposes. Thus, the signals from the detector 40 are sent through a conductor 41 to the downhole electrical circuit 36 for processing and transmission to the earth's surface through a conductor 39 in the armored cable 24.

All of the signals in the conductors 37, 38 and 39 are applied to signal processing and amplification circuit 42 in the computer 26 on the earth's surface. The circuit 42 discriminates against noise and sends an amplified signal corresponding to the output from the long-spaced detector 35 through a conductor 43 to a compensation circuit 44.

Simultaneously, a signal corresponding to the output from the third neutron detector 40 is sent from the processing circuit 42 through a conductor 45 to the compensation circuit 44. The compensation circuit 44 combines the signals from the long-spaced detector 35 and the third neutron detector 40, for example, by adding the two signals together. Adding these two signals provides an output signal in a conductor 46 that corresponds to the sum of the counts registered by the two detectors.

The signal processing circuit 42 applies a signal to a conductor 47 that corresponds to the neutron count registered by the short-spaced detector 34 ($D_1$ in FIG. 1). These signals in the conductors 46 and 47 are coupled to a ratio and porosity circuit 50 of the type described, for example, in the aforementioned Locke et al patent application. The ratio circuit 50 combines the expression $D_1/D_2 + D_3$ and indicates the porosity of the formation 27, corrected for changes in the cement thickness.

As shown in FIG. 2, the porosity signal computed in the circuit 50 is transmitted through a conductor 51 to a recorder 52. The recorder 52 may be of the type that produces a continuous graph of formation porosity as a function of the borehole depth.

The third neutron detector 40 may be replaced in a further embodiment of the invention by a physically equivalent device. In this connection, FIG. 3 shows a borehole logging tool 60 from which the compensating detector 40 (FIG. 2) has been removed and replaced by an auxiliary or secondary neutron source 61. The source can be of the same type as the source 33 but of lower neutron intensity or activity. The precise relation between the neutron source intensities is a function of the neutron detector characteristics and earth formation parameters. Depending on these variables, appropriate source strengths and spacings can be chosen through data collected by investigating earth formations of known characteristics with tool configurations of the type shown in FIG. 3.

The source 61 is disposed vertically above and adjacent to the long-spaced neutron detector 35. Signals from the neutron detectors 34 and 35 are applied to a downhole electrical circuit 62 for transmission through a group of conductors 58 in the cable 24 for transmission to the earth's surface as hereinbefore described.

In accordance with the invention, the neutron source 61 is substantially less active or "weaker" than the primary neutron source 33 positioned in the lowermost portion of the logging tool 60. The secondary neutron source 61 independently establishes a neutron distribution similar to that which is shown in FIG. 1 in connection with the primary neutron source 33. Through an appropriate choice of strength for the source 61 and spacing from the detector 35, the combined neutron distributions from the sources 33 and 61 observed by the detector 35 in the selected illustrative example mutually compensate each other for variations in the borehole environment. Precise detector spacings, neutron source strength and other factors bearing on this relationship can be developed through a series of trials in test formations with known physical characteristics. The composite neutron distribution provided by the two sources 33 and 61 automatically compensate the output signal from the long-spaced detector 35 without further signal manipulation. In this regard, the term "signal," as used to describe specific embodiments of the invention, refers to any suitable information-bearing mechanism that adjusts output signals from the detector 35 in response to changes in the neutron distribution within the borehole environment.

The signals from the detectors 34 and 35 are transmitted to the earth's surface from a downhole signal transmission processing circuit 62 through the group of conductors 58 in the cable 24. These signals are applied to a porosity computation and recording circuit on the earth's surface of the type described, for example, in the aforementioned Locke et al patent application. In this connection, the compensation circuit 44 (FIG. 2) is not required for use with the tool 60 (FIG. 3) inasmuch as the signal from the detector 35 (FIG. 3) is automatically compensated for changes in the borehole environment through the neutron distribution established by the secondary source 61.

Figure 4:
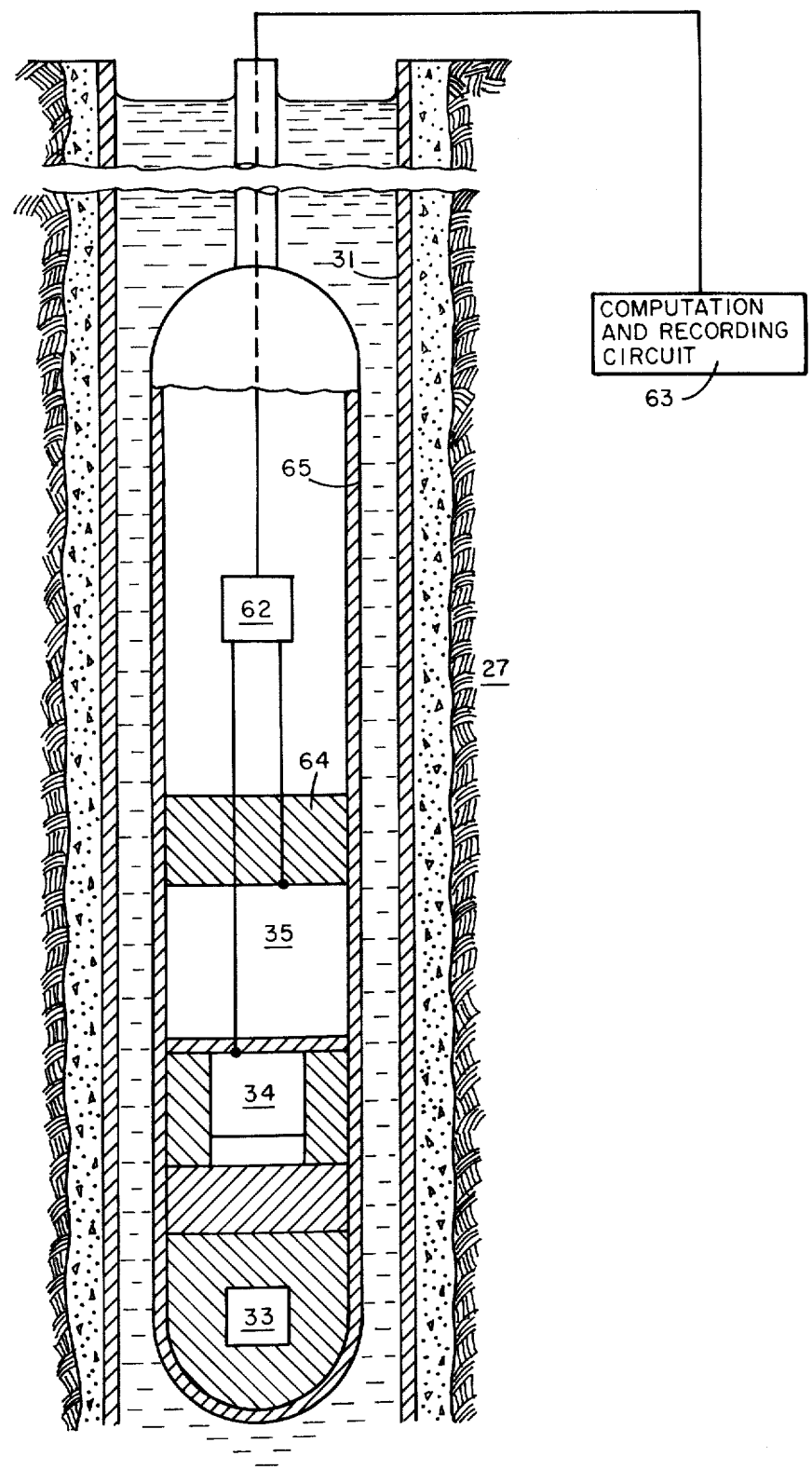
FIG. 4 is a schematic drawing of still another embodiment of the invention.

An additional embodiment of the invention that further characterizes the physical equivalency of other devices with the third detector 40 (FIG. 2) is shown in FIG. 4. A high energy neutron scattering shield 64 formed, for example, of copper, tungsten or steel and the like, is placed within a tool housing 65 immediately above the long-spaced detector 35. High energy neutrons from the source 33 (neutrons having energies in excess of a few kilovolts) reach the scattering shield 64 through the tool housing 65 or are backscattered to the shield 64 from the earth formation 27. The relatively high probability for inelastic collision between the neutrons and the nuclei of these dense metals that comprise the shield 64 scatters or reflects the neutrons into the formation 27 where they are subsequently scattered back to the long-spaced detector 35. The shield 64 is, in effect, a "virtual" neutron source that performs the same function as the secondary neutron source 61 in FIG. 3. These multiply-scattered neutrons, in the illustrative example, establish a neutron distribution in the formation 27 that is similar to the distribution shown in FIG. 1. The long-spaced detector 35 responds to the mutual compensation characterizing the distribution from the neutron source 33 and the scattering shield 64 by producing an output signal that accounts for changes in the borehole environment.

Optimization of the shape and mass of the shield 64 in addition to the relative spacing between the source, shield and detectors can be determined through trials with precisely known formations in the manner described in connection with the embodiment of the invention shown in FIG. 3.

A logging tool in accordance with the present invention may be suspended freely within the borehole by the armored cable 24 (FIG. 2), centralized by means of bowsprings and the like, or urged against a side of the borehole wall, depending on the physical characteristics of the earth formation 27 and the borehole environment. Suitable neutron absorbers and thermalizing shields can be inserted within the tool housing between the neutron sources 33 and 61, detectors 34, 35 and 40, and the shield 64, as appropriate. The neutron distribution, moreover, may be observed through the intensity of the gamma radiation induced within the formation and the borehole as a consequence of the neutrons emitted from the tool. The signal from the detector 40 also can be applied, for example, to the signal from the detector 34 to establish the relationship $D_1 + D_3/D_2 + D_3$ in appropriate circumstances.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A borehole logging system for measuring the porosity of an earth formation comprising a housing, a first neutron source within said housing for establishing a neutron distribution in which the neutron intensity decreases with increasing separation from said source at rates that correspond to the formation and borehole conditions, a short-spaced neutron detector within said housing spaced from said source a sufficient distance to produce signals related to the earth formation porosity, a second neutron detector within said housing positioned beyond said first neutron source and said short-spaced detector to produce signals related to the earth formation porosity, a second neutron source within said housing for establishing an individual neutron distribution that characterizes the formation and borehole conditions, said second neutron source positioned within said housing adjacent to said second neutron detector a sufficiently short distance to at least a portion of said neutron detector to compensate said detector for the borehole conditions.

2. The logging system of claim 1 wherein said second neutron source is positioned on the opposite side of said second neutron detector from said first neutron source and short spaced detector.

3. The logging system of claim 2 wherein said second neutron source strength is less than that of said first neutron source.

4. The logging system of claim 1 wherein said second neutron source strength is less than that of said first neutron source.

5. A borehole logging tool for measuring the porosity of an earth formation comprising a housing, a first neutron source within said housing for establishing a neutron distribution in the earth formation characterized by neutron populations that decrease with increasing distance from said source at rates determined largely by the borehole and earth formation conditions, a pair of neutron detectors within said housing spaced at different distances from said source for producing signals that indicate the earth formation porosity, and means responsive to changes primarily in said borehole conditions for correcting said formation porosity signals for said changes in the borehole conditions, said responsive means further comprising a second source of neutrons within said housing to establish a neutron distribution characterized by neutron populations that decrease with increasing distance from said second source, said second source being spaced from one of the neutron detectors in said detector pair a distance less than said first neutron source.

6. The logging tool of claim 5 wherein said second neutron source is positioned on the opposite side of said pair of neutron detectors from said first neutron source.

7. The logging tool of claim 5 wherein the intensities of neutrons produced by said second neutron source are less than the intensities of neutrons produced by said first source.

8. The logging tool of claim 7 wherein both of said sources are continuous and unpulsed.

9. The logging tool of claim 5 wherein the intensities of neutrons produced by said second neutron source are less than the intensities of neutrons produced by said first source.

10. A tool for measuring the properties of an earth formation traversed by a borehole comprising: a housing, a first source of neutrons for establishing a first neutron distribution within the borehole and the earth formation, a second source means within said housing for establishing a second neutron distribution primarily influenced by the borehole environment, and detector means within said housing for responding to the first and second neutron distributions.

11. The logging tool of claim 10 wherein said neutron detector means is positioned between said primary and second sources.

12. The logging tool of claim 10 wherein said second source produces neutrons of lower intensities than the neutrons produced by said first source.

13. A well logging tool adapted for investigating an earth formation surrounding a borehole, said borehole having an environment which has an influence on the investigation of said earth formation, comprising neutron generating source means adapted for generating high energy neutrons having energy sufficient to penetrate in substantial numbers beyond the borehole and into the formation, said source means also adapted to generate low energy neutrons having energy sufficiently low to penetrate into said borehole environment in substantial numbers and into said earth formation in relatively insubstantial numbers, and first and second radioactive detectors adapted to respond to said neutrons.

14. The apparatus of claim 13 wherein said first and second radioactive detectors produce first and second output signals in response to said neutrons and said apparatus further includes means for combining said first and second signals to produce a representation of at least one formation parameter.

15. The apparatus of claim 13 wherein said second detector responds to said high and low energy neutrons to produce an output signal which is compensated for the effects of the borehole environment.

16. A well logging tool adapted for investigating an earth formation surrounding a borehole that has a layer of material between said formation and borehole which has a disturbing influence on the investigation of said earth formation, comprising neutron generating source means adapted for generating high energy neutrons having energy sufficient to penetrate in substantial numbers beyond the material of disturbing influence and into the formation, said means also adapted to generate low energy neutrons having energy sufficiently low to penetrate said material of disturbing influence in substantial numbers and said earth formation in relatively insubstantial numbers, and first and second radioactive detectors adapted to respond to said neutrons.

17. A method of investigating an earth formation surrounding a borehole, said borehole having an environment which has an influence on the investigation of said earth formation, comprising generating high energy neutrons having energy sufficient to penetrate in substantial numbers beyond the borehole and into the formation, generating low energy neutrons having energy sufficiently low to penetrate into said borehole environment to substantial numbers and said earth formation in relatively insubstantial numbers, and producing first and second signals responsive to said neutrons.

18. The method of claim 17 further including the step of combining said first and second signals to produce a representation of at least one earth formation parameter.

19. The method of claim 17 wherein the step of producing first and second signals includes the step of producing a second signal in response to said high and low energy neutrons which is compensated for the effects of the borehole environment.

20. A method of investigating an earth formation surrounding a borehole which has a layer of material between said formation and borehole which has a disturbing influence on the investigation of said earth formation, comprising generating high energy neutrons having energy sufficient to penetrate in substantial numbers beyond the material of disturbing influence and into the formation, generating low energy neutrons having energy sufficiently low to penetrate the material of disturbing influence in substantial numbers and said earth formation in relatively insubstantial numbers, and producing signals responsive to said neutrons to provide an indication of an earth formation characteristic.

* * * * *